123,009

UNITED STATES PATENT OFFICE.

HIRAM W. FAWCETT, OF TITUSVILLE, AND THOMSON McGOWAN, OF MEREDITH, PENNSYLVANIA.

IMPROVEMENT IN PRESERVING WOOD.

Specification forming part of Letters Patent No. 123,009, dated January 23, 1872.

Specification of an Improved Process of Preserving or Preventing the Decay of Wood, when used in any form for purposes of construction, invented by HIRAM W. FAWCETT, of Titusville, Crawford county, Pennsylvania, and THOMSON McGOWAN, of Meredith, Venango county, Pennsylvania.

The preserving compound used in this process is composed of the following ingredients and in the annexed proportions: One gallon dead oil or petroleum oil, one pound of crude sulphur, one pound of resin, one fourth of a pound of carbolic acid; the above solution to be heated and applied while hot, with hydraulic pressure, to the material to be preserved, either at the end or cross-section of the fiber or by means of immersion in a cylinder.

We claim as our invention—

The process of preserving or preventing the decay of wood used in any form for the purposes of construction, by the use of the compound above mentioned, consisting of the ingredients above named, and combined with heat in the proportions above described.

HIRAM W. FAWCETT.
THOMSON McGOWAN.

Witnesses:
ARCHIE R. GRAY,
C. W. GRASS.